United States Patent
Stenvall et al.

(10) Patent No.: US 6,691,808 B2
(45) Date of Patent: Feb. 17, 2004

(54) DRIVE UNIT FOR MOTOR VEHICLES

(75) Inventors: Lars Stenvall, Ljungskile (SE); Fredrik Hansson, Göteborg (SE)

(73) Assignee: Volvo Car Corporation, Göteborg (SE)

( * ) Notice: Subject to any disclaimer, the term of this patent is extended or adjusted under 35 U.S.C. 154(b) by 63 days.

(21) Appl. No.: 09/760,215

(22) Filed: Jan. 12, 2001

(65) Prior Publication Data

US 2001/0013438 A1 Aug. 16, 2001

(30) Foreign Application Priority Data

Jan. 13, 2000 (SE) .............................................. 0000084

(51) Int. Cl.⁷ ................................................. B60K 6/02
(52) U.S. Cl. ..................................... 180/65.2; 180/343
(58) Field of Search .......................... 180/65.2, 65.3, 180/65.6, 337, 343; 475/2, 5

(56) References Cited

U.S. PATENT DOCUMENTS

| | | | | |
|---|---|---|---|---|
| 3,620,323 A | * | 11/1971 | Maeda et al. ............... | 180/65.2 |
| 3,783,711 A | * | 1/1974 | Orshansky, Jr. ............... | 475/81 |
| 4,335,429 A | * | 6/1982 | Kawakatsu ................... | 701/102 |
| 5,433,282 A | * | 7/1995 | Moroto et al. ............. | 180/65.2 |
| 5,495,912 A | * | 3/1996 | Gray, Jr. et al. ................ | 180/165 |
| 5,730,675 A | * | 3/1998 | Yamaguchi ..................... | 475/2 |
| 5,788,006 A | * | 8/1998 | Yamaguchi ................. | 180/65.2 |
| 6,041,877 A | * | 3/2000 | Yamada et al. ............ | 180/65.2 |
| 6,059,059 A | * | 5/2000 | Schmidt-Brucken ....... | 180/65.3 |
| 6,306,057 B1 | * | 10/2001 | Morisawa et al. ............. | 475/5 |

* cited by examiner

Primary Examiner—Frank Vanaman
Assistant Examiner—Bridget Avery
(74) Attorney, Agent, or Firm—Howrey Simon Arnold & White LLP

(57) ABSTRACT

Drive unit for motor vehicles having an internal combustion engine (1), which, via a first clutch (3) can be coupled to a first input shaft (4) in a gearbox (5), and an electric machine (8), the rotor (10) of which is drivably coupled to a second input shaft (12), and can be coupled, via a second clutch (11) to the crankshaft (2) of the internal combustion engine. The second input shaft is a hollow shaft which can, via a transmission (27, 28, 29) with a third clutch (30), drive the crown wheel (26) in a differential (23) built together with the gearbox.

10 Claims, 1 Drawing Sheet

DRIVE UNIT FOR MOTOR VEHICLES

PRIORITY DESIGNATION

This patent application claims priority to Swedish Patent Application No. 0000084-4 filed Jan. 13, 2000.

TECHNICAL FIELD

The present invention relates to a drive unit for a motor vehicle having an internal combustion engine with an output shaft and a gearbox with an input shaft. A first clutch means or mechanism is arranged between the output shaft of the internal combustion engine and the input shaft of the gearbox. An electric machine is coupled to the gearbox and a second clutch means or mechanism, which together with the first clutch means, are arranged so that drive axles of the vehicle are drivable either solely by the internal combustion engine, solely by the electric machine or by the internal combustion engine and the electric machine at the same time.

BACKGROUND OF THE INVENTION

It has been appreciated that fuel consumption, and thus emissions associated with vehicles driven by internal combustion engines can be reduced if the internal combustion engine is combined with an electric motor. For a given required power, the power/size of the internal combustion engine can be reduced by the corresponding power contribution from the electric motor at the same time as it can be optimized for a narrower rpm and load interval. This could, in total, theoretically provide an increase in efficiency on the order of 40% in such a so-called hybrid engine compared with a pure internal combustion engine of corresponding performance.

A drive unit of the type described by way of introduction is usually referred to as a parallel hybrid, of which there are two main types. In one, the electric motor is placed between the internal combustion engine and the gearbox and acts on the input shaft of the gearbox. In the second, the electric motor is placed after the gearbox and acts on the output shaft of the gearbox; i.e., in principle directly on the drive wheels. Both types have their advantages and disadvantages. The second alternative is preferable as regards drivability and fuel consumption, since the losses between the electric motor and the drive wheels will be minimal. One disadvantage is, however, that the electric motor cannot be used as a starting motor for the internal combustion engine, when the vehicle is standing still. In this case, a separate starting motor will be required. The first alternative does not require a separate starting motor, but the placement of the electric motor between the internal combustion engine and the gearbox, and the torque transmission through the gearbox, results in greater energy losses than with torque transmission directly to the drive wheels.

In view of the above described deficiencies associated with known solutions for drive units for hybrid motor vehicles, the present invention has been developed to alleviate these drawbacks and provide further benefits to the user. These enhancements and benefits are described in greater detail hereinbelow with respect to several alternative embodiments of the present invention.

SUMMARY OF THE INVENTION

The present invention in its several disclosed embodiments alleviates the drawbacks described above with respect to drive units for motor vehicles and incorporates several additional beneficial features.

The purpose of the present invention is to achieve a drive unit of the type described by way of introduction, which combines the advantages of the two parallel hybrid types described above without having their disadvantages, and which also has additional advantages.

This is achieved according to the invention by virtue of the fact that the electric machine has a rotor, which is joined to an input shaft, forming a second input shaft concentrically arranged with the first mentioned input shaft. The transmission is arranged between the second input shaft and an output element of the gearbox. The transmission has a third clutch means or mechanism for engaging and/or disengaging the drive from the second input shaft to the output element of the gearbox.

With a first clutch engaged, the internal combustion engine is mechanically coupled to the first mentioned input shaft in the gearbox and drives, via its various gearing combinations, the output element of the gearbox; e.g., the crown wheel of a differential built together with the gearbox. Via the other clutches and the gearbox, the electric machine can be coupled either directly to the output shaft of the internal combustion engine, regardless of whether the internal combustion engine drives the vehicle or not, or directly to the output element of the gearbox. When the second clutch is engaged and the first and third clutches are released, the electric machine can be used as a starting motor to start the internal combustion engine when the vehicle is standing still.

In drive units comprising an automatic gearbox of planetary type or a so-called CVT (Continuously Variable Transmission), the shifting is done without any momentary gap, a property which is obtained at the cost of efficiency in comparison with a common step-geared gearbox and disc clutch, where the shifting occurs with momentary gaps when the clutch is disengaged.

In a preferred embodiment of the present invention, the gearbox is a manual or automatic step-geared gearbox in which the first mentioned input shaft has gears engaging gears on at least one secondary shaft. At least one gear in each pair of inter-engaging gears is rotatably mounted on its shaft and lockable to the shaft by clutch means or mechanism. With the first and the second clutches disengaged and the third clutch engaged, the torque can be transferred from the electric machine to the output element of the gearbox at the same time as no torque is transmitted between the internal combustion engine and the output element via the first mentioned input shaft and the secondary shaft. This means that shifting can be effected in the gearbox at the same time as driving force is obtained from the electric machine. As a result, shifting can be effected without any momentary gap. It is thus possible to obtain shifting of equal quality to that provided by an automatic gearbox of planetary type, but without the loss of efficiency caused by the latter.

The beneficial effects described above apply generally to the exemplary devices, mechanisms and methods disclosed herein for the present invention. The specific structures and steps through which these benefits are delivered will be described in greater detail hereinbelow.

BRIEF DESCRIPTION OF THE DRAWINGS

The invention will now be described in greater detail in the following way, by example only, and with reference to the attached drawings, in which.

DETAILED DESCRIPTION OF THE INVENTION

Figure 1:
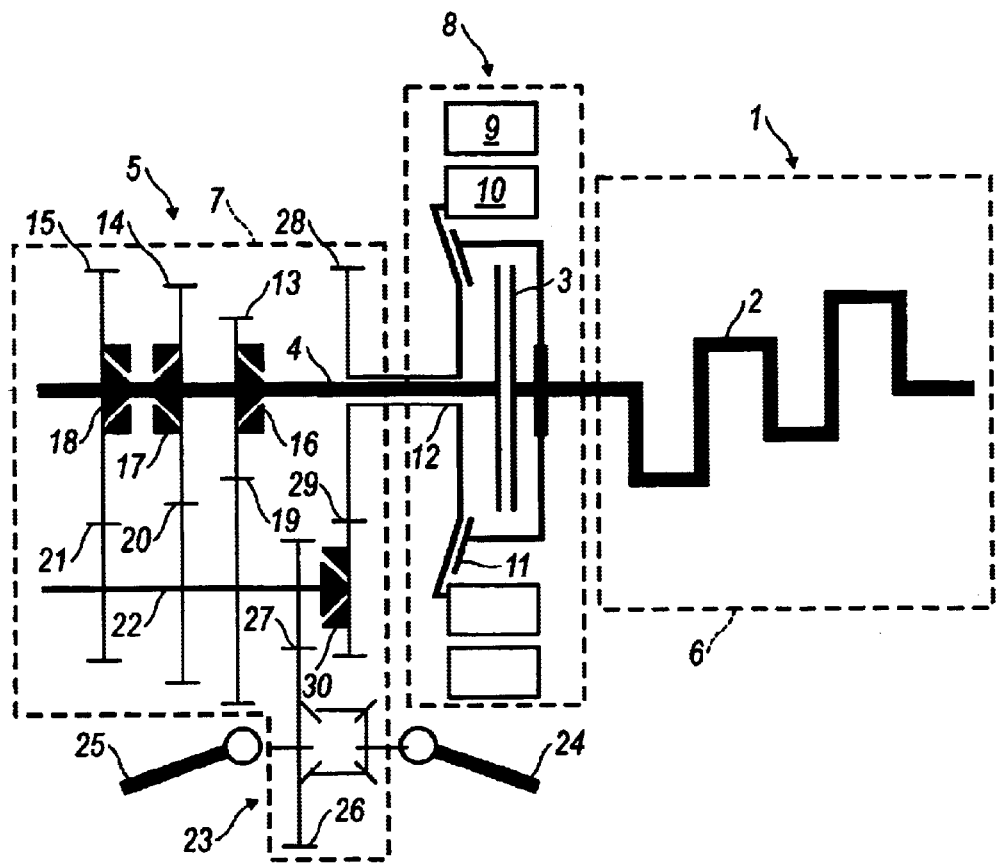
FIG. 1 shows a schematic representation of one embodiment of a drive unit configured according to the invention.

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components or processes. Therefore, specific structural and functional details disclosed herein are not to be interpreted as limiting, but merely as a basis for the claims and as a representative basis for teaching one skilled in the art to variously employ the present invention.

Referring to the FIGURE, the reference numeral 1 designates an internal combustion engine and 2 designates an engine crankshaft, which, via a disc clutch, can be coupled to, or released from an input shaft 4 in a gearbox, generally designated as 5. Between the end wall 6 of the engine 1 on the output side and the end wall 7 of the gearbox 5 on its input side, there is an electric machine 8, having a stator 9 and a rotor 10. The machine can operate as a motor or as a generator. The rotor 10 can, via a disc clutch 11, be coupled to, or disengaged from, a hollow shaft 12 that is journalled concentrically about the input shaft 4.

The gears 13,14,15 are rotatably mounted on the input shaft 4 and are lockable onto the shaft 4 by means of clutches 16,17,18 with associated synchronization. The gears 13,14, 15 engage gears 19,20,21 on a secondary shaft 22. The gears are rotationally fixed to the secondary shaft 22. The gearbox in the illustrated example is built together with a differential 23 between a pair of drive axles 24,25. The differential 23 has a crown wheel 26 engages an output gear 27 that is rotationally fixed to the secondary shaft 22. For the sake of simplicity, the gearbox is shown with only one secondary shaft and three forward gears. In practice, a gearbox with two secondary shafts is used and it has at least four forward gears, effected, for example, utilizing a gearbox of the type which is shown and described in Swedish Application SE-A-8601247-3, but without a reverse gear, since reversing, according to a preferred embodiment, is only done by electric motor operation, as will be described below in more detail.

The rotor 10 of the electric machine 8 can, as is described above, be coupled to a hollow shaft 12, which forms a second input shaft into the gearbox. A gear 28 is rotationally fixed to the hollow shaft 12 and engages a gear 29 which is freely rotatably mounted on the secondary shaft 22 and which can be locked to the secondary shaft by means of a clutch 30. Below, the different operating states of the drive unit are described.

Starting the Internal Combustion Engine

For starting, the clutch 3 and the clutch 30 are disengaged and the clutch 11 is engaged which means that torque can be transmitted directly from the electric machine 8 to the crankshaft 2 of the internal combustion engine. At the same time, torque is transmitted via the hollow shaft 12 and the gear 28 to the gear 29, since the clutch 30 is disengaged. When current is supplied to the electric machine 8, it will thus work as a starter motor for starting the internal combustion engine when the vehicle is standing still.

Acceleration

For acceleration with maximum torque, both the internal combustion engine 1 and the electric machine 8 are in operation and torque is transmitted in this case from these two in parallel with the clutch 3 and the clutch 30 engaged and the clutch 11 disengaged. During shifting, the clutch 3 is disengaged to brake the torque transmission from the internal combustion engine to the input shaft 4 of the gearbox so that shifting can be effected. During this time, the driving from the electric machine 8 is maintained by virtue of the fact that the clutch 30 is kept engaged so that torque is transmitted from the electric machine 8 to the differential 23 throughout the shifting interval so that shifting can be effected without a torque gap or so-called power shifting.

Highway Driving

The drive unit configured according to the invention is primarily dimensioned to use the internal combustion engine 1 alone for driving the vehicle at substantially even speed such as during highway driving. In this configuration, the clutch 3 is engaged and clutches 11 and 30 are disengaged. In a preferred embodiment, an electric machine 8 is used which can also function as a generator; therefore, the electric machine 8 can be used for generative operation, if required, during normal driving to charge the vehicle batteries. In this case, the clutch 11 is engaged together with the clutch 3. The electric machine 8 can, at the same time, if required, be used as an engine brake by engaging the clutch 30 and disengaging the clutch 11.

Electric Motor Operation

Preferably, the electric machine 8 is so dimensioned in relation to the internal combustion engine 1 and to the vehicle itself that the vehicle, at least for short distances, can be driven solely by the electric motor. In this case the clutches 3 and 11 are disengaged and the clutch 30 is engaged. This possibility is used in a preferred embodiment of the drive unit according to the invention to simplify and reduce the cost of the gearbox 5. This embodiment has no mechanical reverse gear; all reverse travel is powered using electric motor operation by reversing the current to the electric machine to shift between forward and reverse drive.

The power of the internal combustion engine 1 is adapted to the power of the electric machine 8, the internal combustion engine exemplarily having a maximum power of 125 kW and the power of the electric machine having a maximum effect in the range of 45–50 kW. Such an electric machine is placed between the internal combustion engine 1 and the gearbox 5 as illustrated, and can have a diameter on the order of 300 mm and does not need to increase the length of the drive unit more than approximately 60 mm over that of a corresponding drive unit without an electric machine.

A drive unit configured according to the present invention has been described above with reference to a preferred embodiment with a so-called mechanical step-geared gearbox that is preferably automated and is controlled by a control unit (not shown) that also controls the engagement and disengagement of the clutches 3, 11 and 30. The drive unit is positioned between the end wall of the internal combustion engine on the output side and the end wall of the gearbox on the input side of the gearbox. Alternatively, and still within the scope of the invention, the electric machine can be placed against the opposite end wall of the gearbox if advantageous for space or packaging reasons. This solution requires, however, that the first input shaft of the gearbox 5 be a hollow shaft with gears corresponding to the gears 13,14,15 and that the output shaft from the internal combustion engine 1 can be coupled, via the clutch 3, to this hollow shaft. Furthermore, an additional shaft is required which is joined to the output shaft of the internal combustion engine and which extends through the hollow shaft to a clutch corresponding to the clutch 11 but at the opposite end wall of the gearbox. This clutch is then joined to a hollow shaft corresponding to the hollow shaft 12 which is mounted concentrically outside the first mentioned input hollow shaft.

Conceivably, and still within the scope of the present invention, a common automatic gearbox with planet gear steps may be utilized instead of an automated mechanical step-geared gearbox, even if this does not provide the same increase in efficiency. Since the arrangement described with three clutches and two input shafts makes shifting possible without any torque gaps in a step-geared gearbox, the user experiences the same shifting quality as in an automatic transmission with planet gear steps and the step-geared gearbox, with its higher efficiency, is preferable.

What is claimed and desired to be secured by Letters Patent is as follows:

1. A drive unit for a motor vehicle, comprising an internal combustion engine with an output shaft, a gearbox with an input shaft, a first clutch arranged between the output shaft of the internal combustion engine and the input shaft of the gearbox, an electric machine coupled to the gearbox, and second clutch, which together with the first clutch are so arranged that drive axles of the vehicle are drivable either solely by the internal combustion engine, solely by the electric machine or by the internal combustion engine and the electric machine at the same time, the electric machine has a rotor, which is joined to an input shaft, forming a second input shaft in the form of a hollow shaft which is journalled about the first mentioned input shaft, a transmission is arranged between the second input shaft and an output element of the gearbox, the transmission comprising a third clutch for engaging and disengaging the drive from the second input shaft to the output element of the gearbox.

2. The drive unit according to claim 1, wherein the transmission comprises at least one gear on the second input shaft and at least one gear on at least a secondary shaft, one of which at least being rotatably mounted on its shaft and lockable to said shaft by said third clutch.

3. A drive unit for a motor vehicle, comprising an internal combustion engine with an output shaft, a gearbox with an input shaft, a first clutch arranged between the output shaft of the internal combustion engine and the input shaft of the gearbox, an electric machine coupled to the gearbox, and second clutch, which together with the first clutch are so arranged that drive axles of the vehicle are drivable either solely by the internal combustion engine, solely by the electric machine or by the internal combustion engine and the electric machine at the same time, the electric machine has a rotor, which is joined to an input shaft, forming a second input shaft concentrically arranged with the first mentioned input shaft, a transmission is arranged between the second input shaft and an output element of the gearbox, the transmission comprising a third clutch for engaging and disengaging the drive from the second input shaft to the output element of the gearbox, and wherein the transmission comprises at least one sear on the second input shaft and at least one gear on at least a secondary shaft, one of which at least being rotatably mounted on its shaft and lockable to said shaft by said third clutch, and wherein the rotatably mounted gear is arranged on the secondary shaft and engages a gear on the second input shaft and another gear engaging a gear on said output element is non-rotatably joined to the secondary shaft.

4. The drive unit according to claim 3, wherein the first mentioned input shaft has gears in engagement with gears on the secondary shaft and that at least one gear in each pair of inter-engaging gears is rotatably mounted on its shaft and is lockable to the shaft by a clutch.

5. The drive unit according to claim 3, wherein the second input shaft is a hollow shaft through which the input shaft extends.

6. The drive unit according to claim 3, wherein the output element is a crown wheel of a differential between two drive wheel axles that is built together with the gearbox.

7. A drive arrangement for a motor vehicle, said arrangement comprising:
    an internal combustion engine having an output shaft;
    a gearbox having a gearbox input shaft;
    a first clutch arranged between the output shaft of the internal combustion engine and the gearbox input shaft;
    an electric machine coupled to the gearbox via a second clutch, the second clutch configured to act together with the first clutch so that a drive axle of the vehicle is drivable solely by the internal combustion engine, solely by the electric machine and by the internal combustion engine and the electric machine simultaneously, the electric machine having a rotor that is joined to a second input shaft that is concentrically arranged with the gearbox input shaft;
    a transmission arranged between the second input shaft and an output element of the gearbox, the transmission having a third clutch for releasably engaging the second input shaft with the output element of the gearbox, the transmission further comprising a gear on the second input shaft releasably engageable with a gear on a secondary shaft and one of said gears being rotatably mounted on the respective shaft and lockable to that shaft by the third clutch,
    the rotatably mounted gear being arranged on the secondary shaft and engageably with a gear on the second input shaft; and
    another gear engaging a gear on the output element that is non-rotatably joined to the secondary shaft.

8. The drive unit according to claim 7 further comprising:
    the gearbox input shaft has gears in engagement with gears on the secondary shaft and at least one gear from each pair of these engaging gears is rotatably mounted on the respective shaft and is lockable to that shaft by a clutch.

9. The drive unit according to claim 7, further comprising:
    the second input shaft is a hollow shaft through which the input shaft extends.

10. The drive unit according to claim 7, further comprising:
    the output element is a crown wheel of a differential between two drive wheel axles that is built together with the gearbox.

* * * * *